United States Patent [19]

Kispert et al.

[11] 4,155,606
[45] May 22, 1979

[54] TWO-PART PLASTIC COMB CAGE

[75] Inventors: Klaus Kispert, Schweinfurt; Hans Meining, Dittelbrunn, both of Fed. Rep. of Germany

[73] Assignee: SKF Industrial Trading & Development B.V., Nieuwegein, Netherlands

[21] Appl. No.: 742,564

[22] Filed: Nov. 17, 1976

[30] Foreign Application Priority Data

Nov. 19, 1975 [DE] Fed. Rep. of Germany ... 7536725[U]

[51] Int. Cl.² .......................................... F16C 13/00
[52] U.S. Cl. ................................................. 308/217
[58] Field of Search .............. 308/217, 218, 195, 196, 308/201, 235; 29/148.4 R, 148.4 C

[56] References Cited

U.S. PATENT DOCUMENTS

| 3,361,499 | 1/1968 | Kearns | 308/201 |
| 3,387,901 | 6/1968 | Williams | 308/217 |
| 3,944,307 | 3/1976 | Bingle | 308/217 |

FOREIGN PATENT DOCUMENTS

| 1209815 | 1/1966 | Fed. Rep. of Germany | 308/201 |
| 1903578 | 7/1970 | Fed. Rep. of Germany | 308/201 |

Primary Examiner—Charles E. Frankfort
Attorney, Agent, or Firm—Daniel M. Rosen

[57] ABSTRACT

A plastic cage for a rolling bearing is formed of a comb part having rivet pins formed unitarily therewith. Recesses are provided in the cage side rings, aligned with the bridges, in order to inhibit deformation of the comb structure. The rivets are formed in the ends of the bridges, and are ultrasonically riveted in corresponding holes in the cage cover.

5 Claims, 5 Drawing Figures

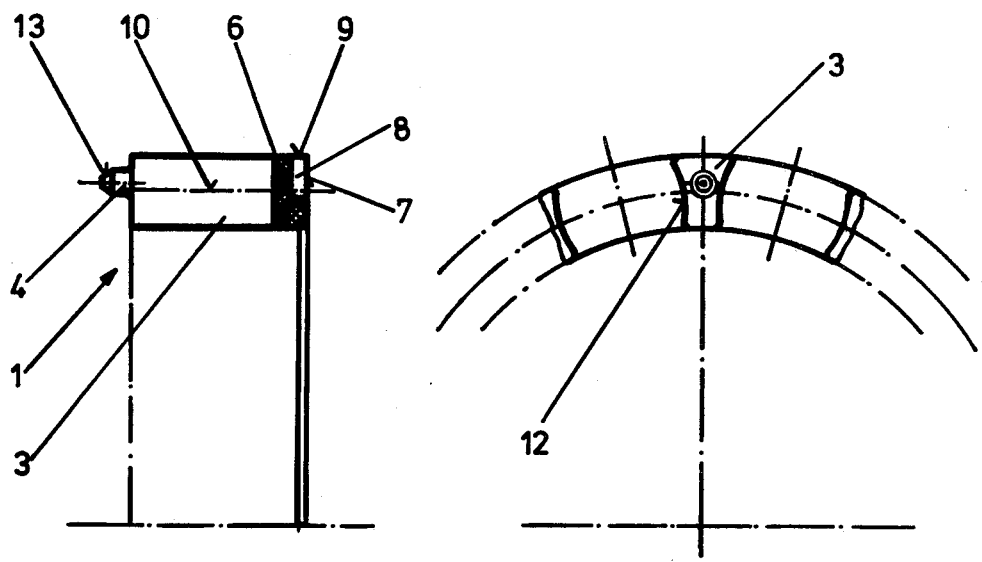

TWO-PART PLASTIC COMB CAGE

This invention relates to a two-part comb cage of plastic material, especially for radial rolling bearings, in which the rivet pins are formed preferably unitarily with the cage bridge, for example, on a cage surface.

Comb cages formed of plastic material are already known. In the formation of the comb cages from fiber reinforced plastic materials, the bridges of the cages distort substantially centrally inwardly following the spraying operations employed in the formation process, so that it is difficult to install the rivets, for example, in holes in the cage cover. The known cages have a further disadvantage in that they must be held in the radial as well as in the circumferential direction by special fixtures, since they tend to "swim away" under the sonotrode when the rivets are being ultrasonically riveted in the cage covers.

The invention is directed to the provision of a cage of the above type, whose parts can be assembled without difficulty, without the occurrence of excessive tensions in the cage, and which can be held in the radial as well as in the circumferential direction during ultrasonic welding in a simple manner.

Briefly stated, in accordance with the invention, the cage side ring, on the side thereof away from the bridges, is provided with recesses in the region of the bridges. The recesses preferably extend, from the surface of the cage side rings, radially inwardly into the pitch circle or median circle of the ring. The depths of the recesses, in the axial direction, correspond to about half of the corresponding dimensions of the cage side rings.

In order that the invention will be more clearly understood it will now be disclosed in greater detail with reference to the accompanying drawings, wherein:

FIG. 1 is a cross-sectional view of a portion of a comb cage in accordance with the invention;

FIG. 2 is a side view of the cage portion of FIG. 1, taken from the left;

Figure 3:
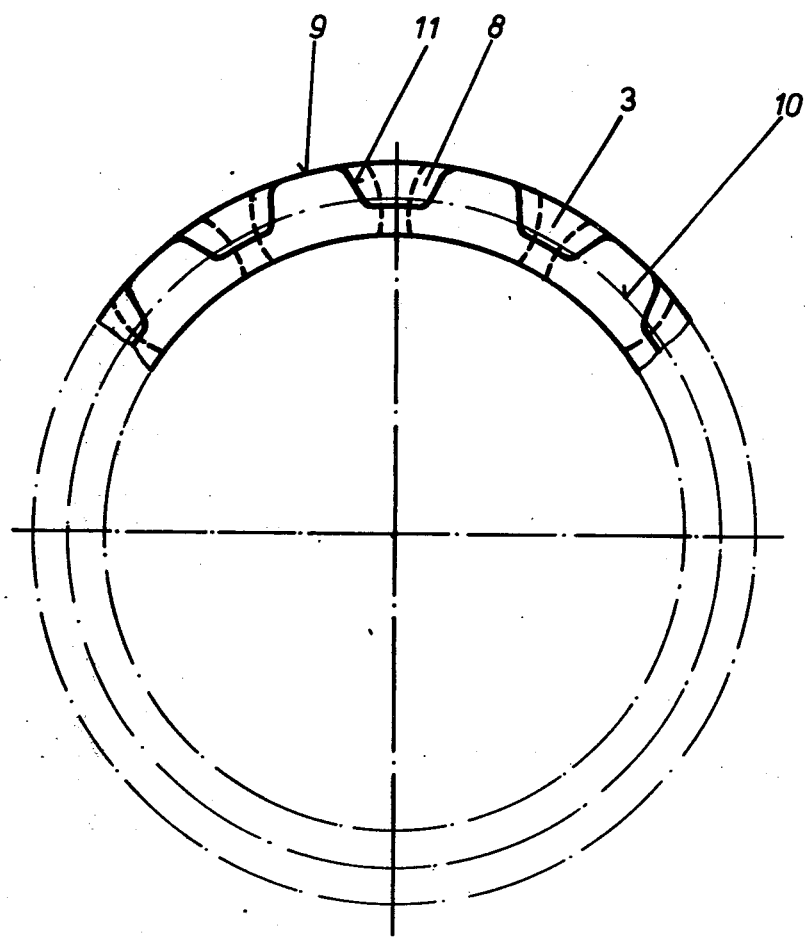
FIG. 3 is a side view of the cage portion of FIG. 1, taken from the right.
Figure 4:
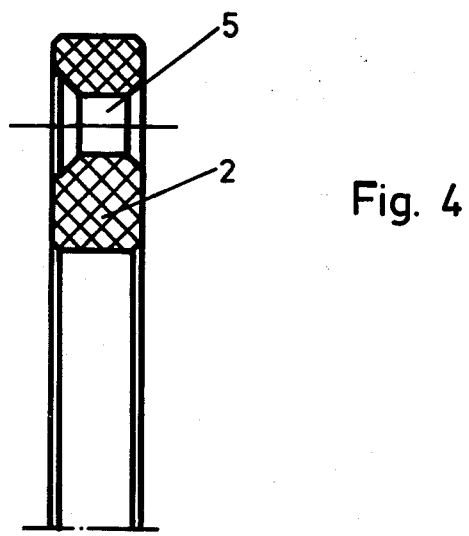
FIG. 4 is a cross-sectional view of a portion of a cover for a cage of FIG. 1.
Figure 5:
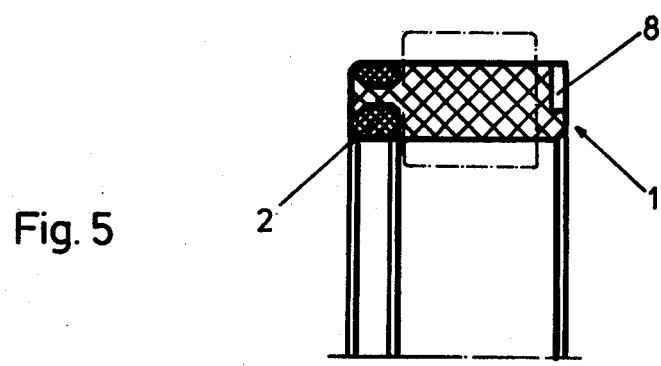
FIG. 5 is a cross-sectional view of the comb cage and the cover riveted thereto, in accordance with the invention, on one side of the axis of the assembly.

Referring now to the drawings, FIGS. 1–5 show a fiber reinforced plastic comb cage for cylindrical roller bearings comprised of a comb part 1 as shown in FIGS. 1–3, and a cover as shown in FIG. 4. The bridges 3 of comb part 1 are formed with rivet pins 4, which are adapted to be inserted in the holes 5 of the cover 2 in the assembled cage as shown in FIG. 5. The cage and cover may be riveted together ultrasonically.

In accordance with the invention, the cage side ring 6, as is especially apparent in FIGS. 1 and 3, is provided with recesses 8 on the side face 7 thereof away from the bridges 3, the recesses 8 in each case being in the region of the bridges 3. The recesses 8 extend inwardly from the radially outer surface 9 of the cage side ring 6 somewhat past the pitch circle or median circle 10 of the side ring 6.

The recesses 8 have depths axially of the cage corresponding to about half the axial thickness of the cage side ring. Due to the provision of these recesses, the bridges 3 do not tilt centrally inwardly following the spraying in the formation of the comb part from fiber reinforced plastic materials. As a result the cage cover 2 can be easily mounted on the comb cage and only a minimum amount of tension is produced in the cage. The recesses 8 preferably converge in the radial direction toward the rim 11, so that they extend in axial planes substantially parallel to the bridge walls 12 (FIG. 2) of the adjacent bridges 3. The rivet pins 4 are bevelled on their ends 13, and are inserted in the corresponding holes 5 of the cage cover 2. Furthermore, in accordance with the invention the recesses 8 enable the cage to be affixed to the table of the welding machine (not shown) during ultrasonic riveting, in the radial as well as in the circumferential direction. Only a projection lug of the welding machine need be provided, engaging the recess 8 of the cage, in order to aid in the holding of the cage.

The above-described arrangement constitutes only one example of the cage of the invention. Changes in the construction of the individual components are further contemplated in the invention. For example, the rivet pins may be arranged on the cage cover, so that they may be inserted in corresponding recesses in the bridges. In addition, the cage in accordance with the invention is suitable not only for cylindrical roller bearings but may, for example, also be employed for taper roller bearings, self-aligning (radial) roller bearings, etc. It is therefore intended in the following claims to cover each such variation and modification as falls within the true spirit and scope of the invention.

What is claimed is:

1. In a two-part cage for rolling bearings, including a plastic comb having bridges extending from a cage side ring, a cover on the ends of said bridges away from the side ring, and rivet means riveting the cover to said bridges, the improvement wherein said side ring has recesses on the side thereof away from said bridges, said recesses being circumferentially aligned with said bridges and extending radially inwardly from the outer surface of said ring to substantially the pitch circle of said side ring, and have axial dimensions substantially equal to half the axial dimension of said side ring, said recesses limiting the build-up of stresses in said bridges and side ring during formation thereof, to prevent said bridges from tilting centrally inwardly, and thus, preventing impairment of assembly with said cover.

2. The cage of claim 1, wherein said recesses converge radially outwardly, whereby the sides of said recesses extend in planes parallel to the corresponding planes of the adjacent bridges.

3. The comb cage of claim 1, wherein said rivet means comprises rivet pins formed unitarily on the axial ends of said bridges.

4. The cage of claim 3, wherein said rivet pins are cylindrical and have bevelled ends.

5. The cage of claim 1, wherein said bridges and ring are formed of fiber reinforced plastic material.

* * * * *